(12) United States Patent
Freedman et al.

(10) Patent No.: US 12,370,457 B2
(45) Date of Patent: Jul. 29, 2025

(54) SURFACE-MOUNTED VEHICLE HAVING A RAIL COUPLING SYSTEM

(71) Applicant: Universal City Studios LLC, Universal City, CA (US)

(72) Inventors: Daniel Freedman, Ocoee, FL (US); Dustin W. Fike, Orlando, FL (US); Felix M. Chao Rodriguez, Orlando, FL (US); William Miller, Orlando, FL (US); Dwain South, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 877 days.

(21) Appl. No.: 17/540,460

(22) Filed: Dec. 2, 2021

(65) Prior Publication Data
US 2022/0184512 A1     Jun. 16, 2022

Related U.S. Application Data

(60) Provisional application No. 63/124,446, filed on Dec. 11, 2020.

(51) Int. Cl.
*A63G 31/00* (2006.01)
*B61B 10/00* (2006.01)

(52) U.S. Cl.
CPC .............. *A63G 31/00* (2013.01); *B61B 10/00* (2013.01)

(58) Field of Classification Search
CPC ................................. B61B 10/00; A63G 31/00
See application file for complete search history.

(56) References Cited

U.S. PATENT DOCUMENTS

| | | |
|---|---|---|
| 5,970,578 A | 10/1999 | Mensching et al. |
| 8,214,081 B2 | 7/2012 | Choi et al. |
| 8,443,539 B2 | 5/2013 | Cabahug et al. |
| 8,604,900 B2 | 12/2013 | Kocijan |
| 9,011,197 B2 | 4/2015 | Smoot et al. |
| 2010/0227527 A1* | 9/2010 | Smoot ........................ A63F 9/34 446/362 |

(Continued)

FOREIGN PATENT DOCUMENTS

| | | |
|---|---|---|
| EP | 3048078 A1 | 7/2016 |
| WO | 2005082748 | 9/2005 |
| WO | 2020047507 | 3/2020 |

OTHER PUBLICATIONS

PCT/US2021/062046 International Search Report and Written Opinion mailed Apr. 4, 2022.

(Continued)

*Primary Examiner* — Robert J McCarry, Jr.
(74) *Attorney, Agent, or Firm* — Fletcher Yoder, P.C.

(57) ABSTRACT

A surface-mounted vehicle includes a body and a mounting system configured to couple the surface-mounted vehicle to a surface. The surface-mounted vehicle also includes a propulsion system configured to move the surface-mounted vehicle along the surface. In addition, the surface-mounted vehicle includes a rail coupling system having at least one rail coupled to the body. The at least one rail is configured to couple a component to the surface-mounted vehicle. The rail coupling system also includes multiple electrical connectors disposed along the at least one rail. The electrical connectors are configured to provide electrical power to the component.

20 Claims, 5 Drawing Sheets

(56) References Cited

U.S. PATENT DOCUMENTS

| | | |
|---|---|---|
| 2012/0184385 A1 | 7/2012 | Davis |
| 2016/0271803 A1 | 9/2016 | Stewart |
| 2019/0069379 A1 | 2/2019 | Kastee et al. |

OTHER PUBLICATIONS

Eric B, The T-Worx Intelligent Rail platform approved after U.S. Army tests—Some thoughts, The Firearms Blog, Feb. 14, 2019, https://www.thefirearmblog.com/blog/2019/02/14/the-t-worx-intelligent-rail-platform-approved-after-u-s-army-tests-some-thoughts/.

The World's First Two-Picatinny-Rail Adapter, Airsoft SpecOps, Sep. 21, 2014, https://www.airsoftspecops.com/Forums/DisplayComments. php?file=Airsoft3D/The_World.s_First_Two-Picatinny-Rail_Adapter.

\* cited by examiner ly claims priority from and the benefit of
SURFACE-MOUNTED VEHICLE HAVING A RAIL COUPLING SYSTEM

CROSS-REFERENCE TO RELATED APPLICATION

This application claims priority from and the benefit of U.S. Provisional Application Ser. No. 63/124,446, entitled "SURFACE-MOUNTED VEHICLE HAVING A RAIL COUPLING SYSTEM," filed Dec. 11, 2020, which is hereby incorporated by reference in its entirety.

BACKGROUND

The present disclosure relates generally to a surface-mounted vehicle having a rail coupling system.

Various components may be mounted around a stage to facilitate performance of a theatrical production. For example, lights may be coupled to the ceiling and/or the wall(s) and directed toward the stage. In addition, speakers may be positioned around the stage and directed toward the audience. Furthermore, animated figures (e.g., puppets) may be suspended from the ceiling and controlled by cables and actuators. Due to the large number of components mounted around the stage, reconfiguring the theater for a different theatrical production (e.g., uncoupling components from mounts, moving the components to a different location, moving certain components to a storage area, adding new components, coupling components to mounts, etc.) may be a complex and time-consuming process, thereby increasing the cost of the productions and/or delaying performances.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In certain embodiments, a surface-mounted vehicle includes a body and a mounting system configured to couple the surface-mounted vehicle to a surface. The surface-mounted vehicle also includes a propulsion system configured to move the surface-mounted vehicle along the surface. In addition, the surface-mounted vehicle includes a rail coupling system having at least one rail coupled to the body. The at least one rail is configured to couple a component to the surface-mounted vehicle. The rail coupling system also includes multiple electrical connectors disposed along the at least one rail. The electrical connectors are configured to provide electrical power to the component.

DRAWINGS

These and other features, aspects, and advantages of the present disclosure will become better understood when the following detailed description is read with reference to the accompanying drawings in which like characters represent like parts throughout the drawings, wherein.

Figure 1:
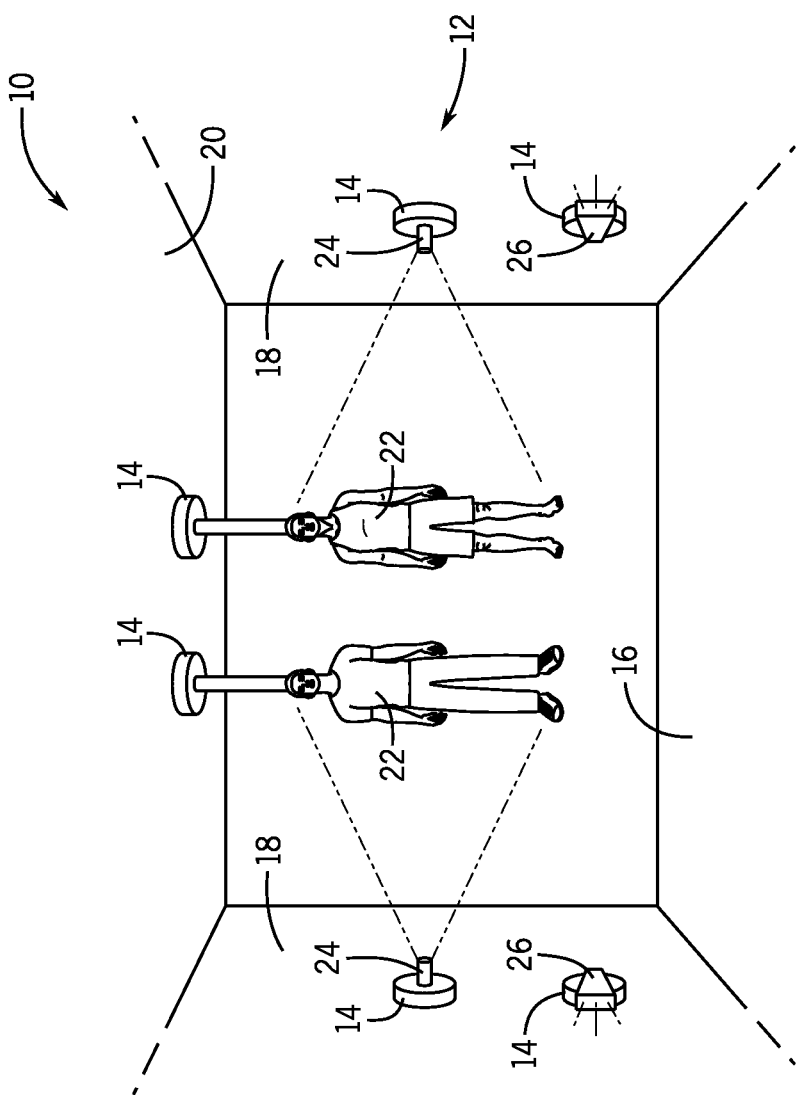
FIG. 1 is a perspective view of an embodiment of a performance environment having a theatrical production system including multiple surface-mounted vehicles.
Figure 2:
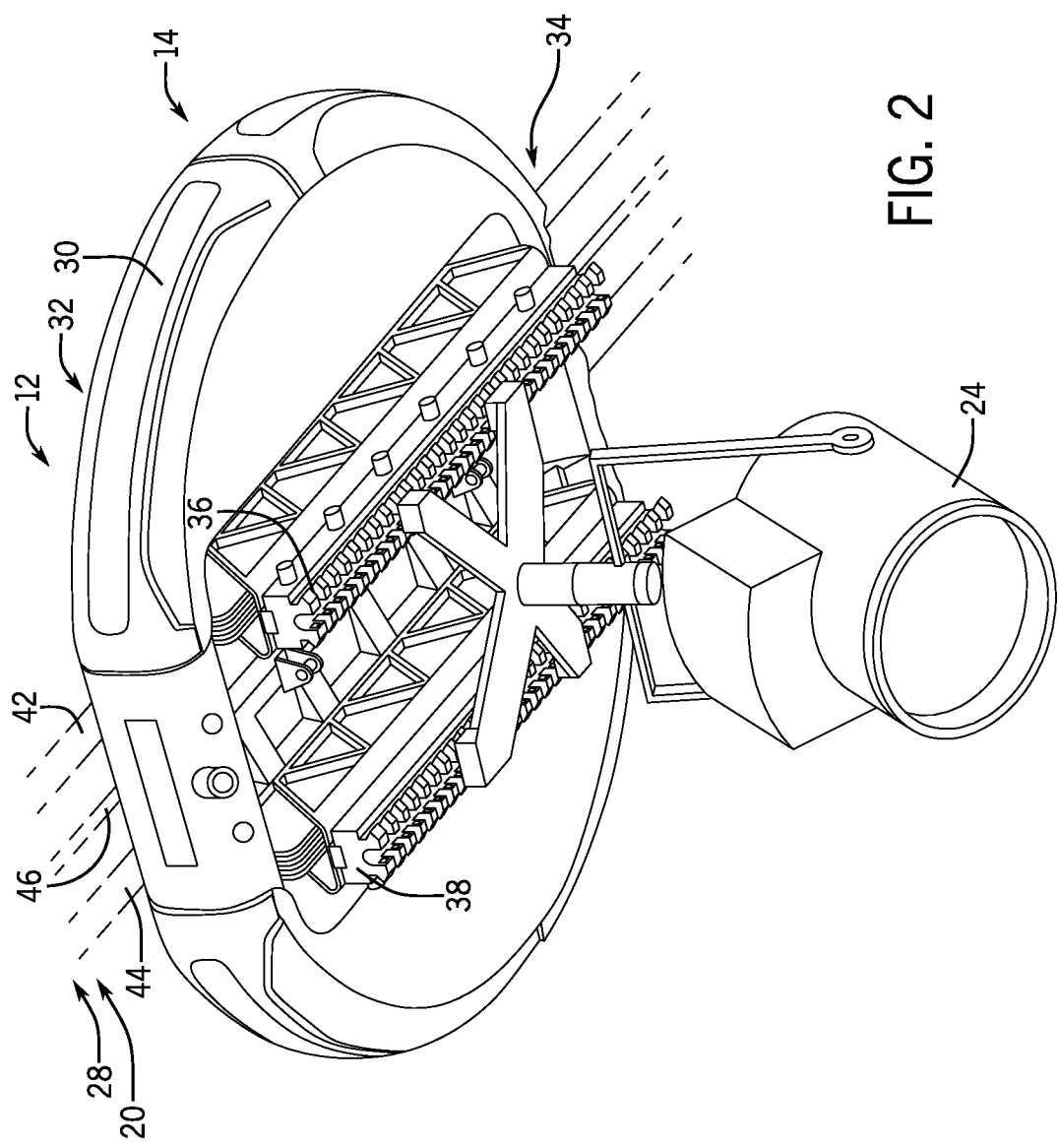
FIG. 2 is a perspective view of an embodiment of a theatrical production system that may be employed within the performance environment of FIG. 1, in which the theatrical production system includes a surface-mounted vehicle and a surface assembly.
Figure 3:
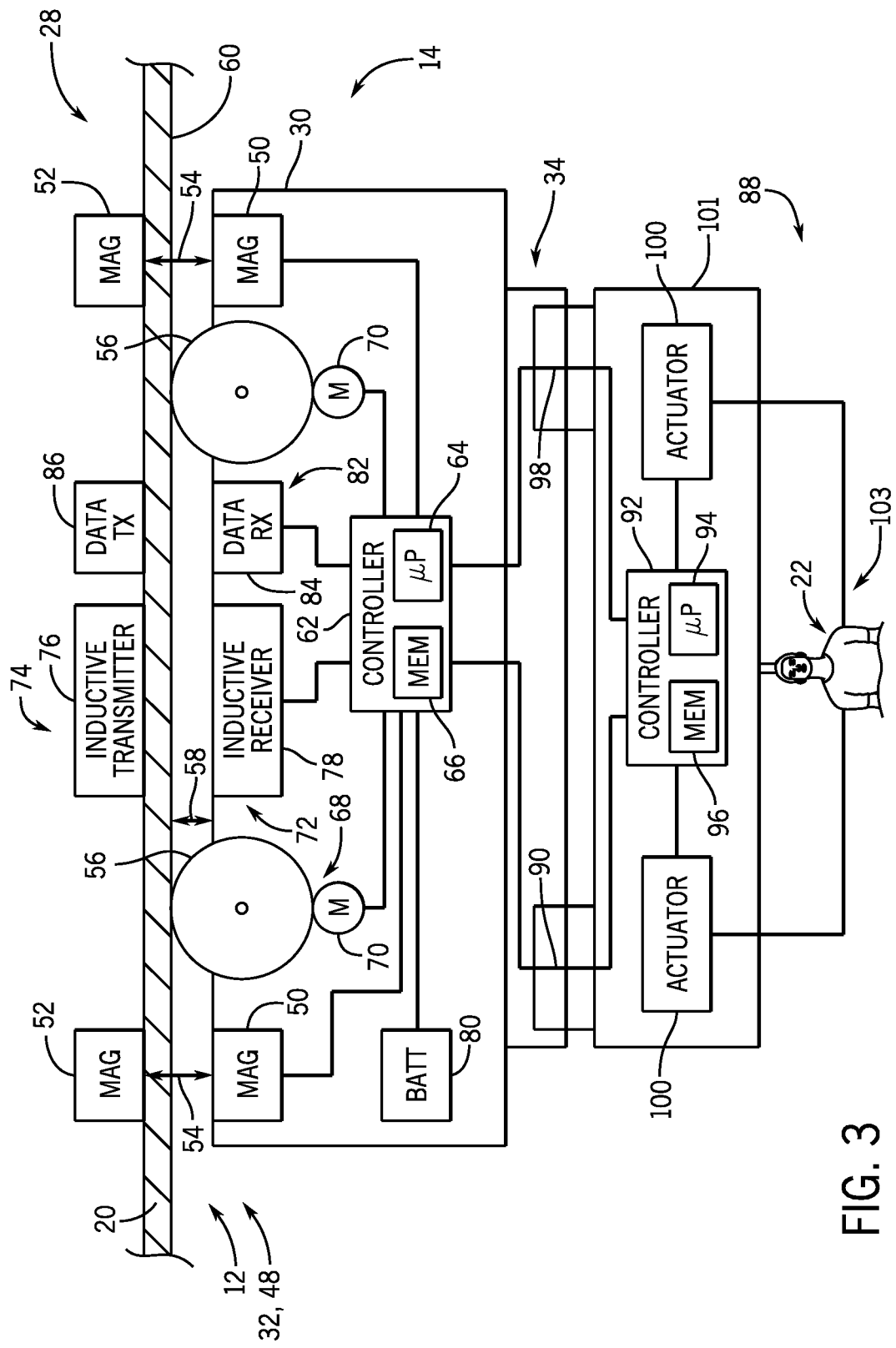
FIG. 3 is a block diagram of an embodiment of a theatrical production system that may be employed within the performance environment of FIG. 1, in which the theatrical production system includes a surface-mounted vehicle and a surface assembly.
Figure 4:
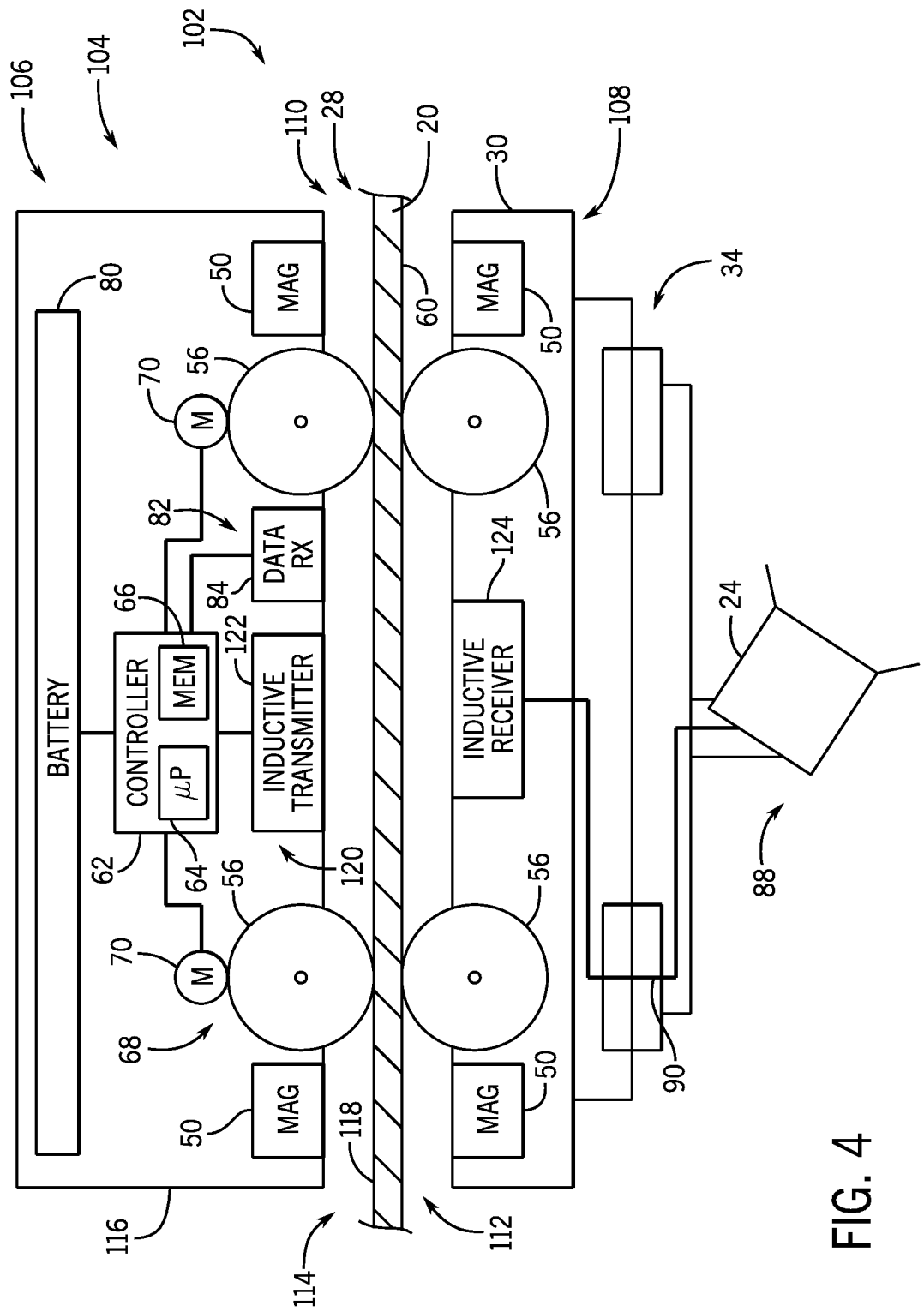
Figure 5:
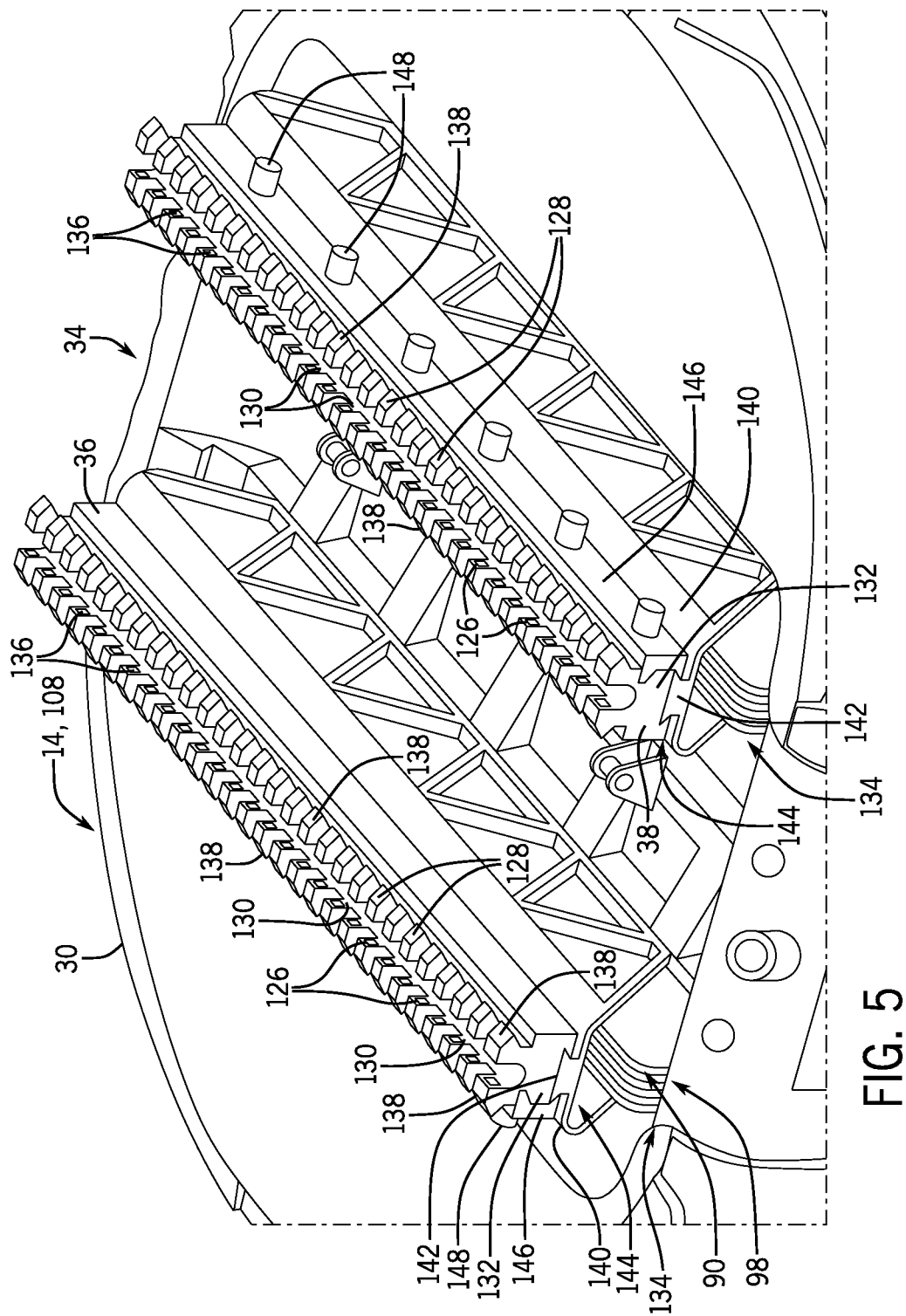

FIG. 4 is a block diagram of another embodiment of a theatrical production system that may be employed within the performance environment of FIG. 1, in which the theatrical production system includes a surface-mounted vehicle and a surface assembly; and FIG. 5 is a perspective view of an embodiment of a rail coupling system that may be employed within any of the surface-mounted vehicles of FIGS. 2-4.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

FIG. 1 is a perspective view of an embodiment of a performance environment 10 having a theatrical production system 12 including multiple surface-mounted vehicles 14. In the illustrated embodiment, the performance environment 10 includes a stage 16, walls 18, and a ceiling 20, and a theatrical production (e.g., a musical, a play, a monolog, etc.) may be performed within the performance environment 10. For example, one or more actors may stand on the stage 16 and move throughout the performance environment 10 during the theatrical production. In addition, audience seating may be positioned adjacent to the performance environment 10 to enable an audience to view the theatrical production.

In the illustrated embodiment, the surface-mounted vehicles 14 support multiple components that facilitate performance of the theatrical production. As illustrated, two surface-mounted vehicles 14 are coupled to the ceiling 20, and each surface-mounted vehicle 14 coupled to the ceiling 20 supports a respective animated FIG. 22 (e.g., puppet). As discussed in detail below, each surface-mounted vehicle 14 may actuate one or more cables coupled to the respective animated FIG. 22 to facilitate movement of one or more portions (e.g., arm(s), leg(s), head, etc.) of the respective animated FIG. 22. In addition, two surface-mounted vehicles 14 are coupled to each wall 18 of the performance environment 10. With regard to each wall 18, one surface-mounted vehicle 14 supports a respective light 24, and another surface-mounted vehicle 14 supports a respective speaker 26. In the illustrated embodiment, each light 24 is directed toward a respective animated FIG. 22, and the speakers 26 are directed toward the audience. However, in other embodiments, at least one light 24 may be directed toward another suitable portion of the performance environment 10, and/or at least one speaker 26 may be oriented in another suitable direction.

In certain embodiments, the theatrical production system 12 includes surface assemblies and the surface-mounted vehicles 14. The surface assemblies may include the stage 16, one or more walls 18, the ceiling 20, or a combination thereof. Furthermore, in certain embodiments, at least one surface-mounted vehicle 14 includes a body and a mounting system configured to couple the surface-mounted vehicle to the surface assembly. In addition, the surface-mounted vehicle 14 includes a propulsion system configured to move the surface-mounted vehicle 14 along the surface assembly. The surface-mounted vehicle 14 also includes a rail coupling system having at least one rail coupled to the body. The rail(s) are configured to couple a component to the surface-mounted vehicle 14, such as an animated FIG. 22, a light 24, or a speaker 26. Furthermore, the rail(s) include multiple electrical connectors disposed along the rail(s), in which the electrical connectors are configured to provide electrical power to the component. The rail(s) are configured to support the component while the surface-mounted vehicle 14 is coupled to the ceiling, to a wall, or to the stage. Accordingly, the surface-mounted vehicle 14 may position the component along any suitable surface of the performance environment 10.

The surface-mounted vehicles 14 are configured to facilitate reconfiguration of the performance environment during a theatrical production and/or between theatrical productions. For example, during a theatrical production, the surface-mounted vehicles 14 coupled to the ceiling 20 may move, via the respective propulsion systems, the animated FIG. 22 throughout the performance environment 10, thereby enhancing the theatrical production. Furthermore, the surface-mounted vehicles 14 coupled to the walls 18 may move, via the respective propulsion systems, the respective lights 24 to suitable locations for illumination of the respective animated FIG. 22. Furthermore, the surface-mounted vehicles 14 may be used to reconfigure the performance environment between theatrical productions. For example, if speakers 26 are not desired for a subsequent performance, the respective surface-mounted vehicles 14 may move, via the respective propulsion systems, the speakers 26 out of the performance environment (e.g., to a backstage area). Furthermore, the surface-mounted vehicles 14 supporting the animated FIG. 22 may move the animated figures out of the performance environment, and/or surface-mounted vehicle(s) supporting other animated figure(s) may move into the performance environment.

In addition, the rail(s) of each surface-mounted vehicle enable a variety of components to be coupled to the surface-mounted vehicle. Accordingly, a single type of surface-mounted vehicle may be used to support a variety of components within the performance environment (e.g., light(s), speaker(s), animated figure(s), winch(es), display(s), projector(s), etc.). In addition, the rail(s) provide electrical power to the respective component, thereby facilitating operation of the component. As discussed in detail below, electrical power may be transferred to the surface-mounted vehicle and, thus, to the respective component via an inductive power system and/or a direct electrical connection. Furthermore, in certain embodiments, the component may include a control module, which is coupled to the rail(s), and an actuator component (e.g., animated figure, etc.) controlled by the control module.

While the surface-mounted vehicles support two lights in the illustrated embodiment, in other embodiments, the surface-mounted vehicles may support more or fewer lights on any suitable surface(s) of the performance environment. In addition, while the surface-mounted vehicles support two animated figures in the illustrated embodiment, in other embodiments, the surface-mounted vehicles may support more or fewer animated figures on any suitable surface(s) of the performance environment. Furthermore, while the surface-mounted vehicles support two speakers in the illustrated embodiment, in other embodiments, the surface-mounted vehicles may support more or fewer speakers on any suitable surface(s) of the performance environment. While the surface-mounted vehicles support lights, animated figures, and speakers in the illustrated embodiment, in other embodiments, at least one surface-mounted vehicle may support another suitable component, such as a winch, a fog machine, a theatrical laser assembly, a display, or a movable wall. Furthermore, while each surface-mounted vehicle supports a single respective component in the illustrated embodiment, in other embodiments, at least one surface-mounted vehicle may support multiple components, and/or at least two surface-mounted vehicles may support a single/common component. While the surface-mounted vehicles are used within a performance environment in the illustrated embodiment, in other embodiments, the surface-mounted vehicles may be utilized to control the position of components within other suitable environments, such as within an amusement park ride, within a service bay of a repair shop, within a store, within a warehouse, or within other suitable environments.

FIG. 2 is a perspective view of an embodiment of a theatrical production system 12 that may be employed within the performance environment of FIG. 1, in which the theatrical production system 12 includes a surface-mounted vehicle 14 and a surface assembly 28. In the illustrated embodiment, the surface assembly 28 includes the ceiling 20. However, in other embodiments, the surface assembly may include a wall or a stage, as previously discussed above with reference to FIG. 1.

In the illustrated embodiment, the surface-mounted vehicle 14 includes a body 30 and a mounting system 32 configured to couple the surface-mounted vehicle 14 to the surface assembly 28. In certain embodiments, the mounting system 32 includes a magnetic mounting system having at least one magnet and/or at least one ferromagnetic structure configured to couple the surface-mounted vehicle 14 to the surface assembly 28 via magnetic attraction. For example, one or more magnets may be coupled to the body 30 of the surface-mounted vehicle 14, and the surface assembly 28 may include one or more ferromagnetic (e.g., steel, iron, etc.) structures and/or one or more magnets. By way of further example, the surface assembly 28 may include one or more magnets, and a ferromagnetic (e.g., steel, iron, etc.) structure and/or one or more magnets may be coupled to the body 30 of the surface-mounted vehicle 14. In certain embodiments, the magnet(s)/ferromagnetic structure(s) of the surface assembly may be separated from the magnet(s)/ferromagnetic structure(s) of the surface-mounted vehicle by a gap to reduce friction between the surface-mounted vehicle and the surface assembly, thereby facilitating movement of the surface-mounted vehicle along the surface assembly. For example, wheels of the surface-mounted vehicle may extend between the body and the surface assembly to establish the gap. While the mounting system 32 includes a magnetic mounting system in the illustrated embodiment, in other embodiment, the mounting system may include any other suitable device(s) and/or system(s) configured to couple the surface-mounted vehicle to the surface assembly (e.g., alone or in combination with the magnetic mounting system), such as one or more of a rail/track system, a slot/protrusion system, or a cable/strap system.

As discussed in detail below, the surface-mounted vehicle 14 also includes a propulsion system configured to move the surface-mounted vehicle along the surface assembly 28. The propulsion system may include one or more motors, one or more wheels, one or more actuators, or a combination thereof. For example, in certain embodiments, the propulsion system may include one or more electric motors configured to drive one or more drive wheels to rotate. Each drive wheel may be rotatably coupled to the body of the surface-mounted vehicle and engaged with the surface assembly. Accordingly, electric motor(s) and drive wheel(s) may propel the surface-mounted vehicle along the surface assembly. While electric motor(s) are disclosed above, the propulsion system may include any other suitable motor(s) (e.g., alone or in addition to the electric motor(s)), such as hydraulic motor(s) and/or pneumatic motor(s). In addition, the propulsion system may include a pivotable wheel (e.g., a driven wheel or a non-driven wheel) and an actuator (e.g., electric actuator, pneumatic actuator, hydraulic actuator, etc.) configured to drive the pivotable wheel to pivot, thereby steering the surface-mounted vehicle along a target path. Additionally or alternatively, the propulsion system may control the direction of movement of the surface-mounted vehicle along the surface assembly by controlling the rotational speeds of multiple wheels. For example, a first motor may drive a first wheel to rotate at a first rotational speed, and a second motor may drive a second wheel to rotate at a second rotational speed, different than the first rotational speed, to control the direction of movement of the surface-mounted vehicle. While wheels are disclosed above, the propulsion system may include any other suitable device(s)/system(s) configured to move the surface-mounted vehicle along the surface assembly (e.g., alone or in combination with wheel(s)), such as a gear/rack assembly and/or a cable/pulley assembly.

The surface-mounted vehicle 14 includes a rail coupling system 34 configured to couple a component to the surface-mounted vehicle 14. In the illustrated embodiment, the rail coupling system 34 includes a first rail 36 and a second rail 38 substantially parallel to one another. As used herein, "substantially parallel" refers to a difference in orientation between the first and second rails of less than a threshold angle. For example, the threshold angle may be 0.5 degrees, 1 degree, 2 degrees, 3 degrees, 5 degrees, or 10 degrees. As discussed in detail below, the rail coupling system 34 includes multiple electrical connectors disposed along at least one of the rails, in which the electrical connectors are configured to provide electrical power to the component. For example, a first set of one or more electrical connectors may be disposed along the first rail 36, and a second set of one or more electrical connectors may be disposed along the second rail 38. The first set of electrical connectors and the second set of electrical connectors may be configured to have opposite polarity, thereby facilitating electrical power transfer to the component. Furthermore, in certain embodiments, the rail coupling system 34 may include one or more data connectors disposed on at least one rail. The data connector(s) are configured to establish a communication link between a controller of the surface-mounted vehicle and the component, thereby facilitating control of the component. While the rail coupling system includes two parallel rails in the illustrated embodiment, in other embodiments, the rail coupling system may include more or fewer rails (e.g., 1, 3, 4, 5, 6, or more), in which each rail is orientated at any suitable angle.

Each rail is configured to couple the component to the surface-mounted vehicle. For example, each rail may include a mounting portion configured to engage a corresponding mounting portion of the component. In certain embodiments, the mounting portion of each rail includes lateral protrusions configured to engage respective lateral recesses within the corresponding mounting portion of the component. By way of example, the corresponding mounting portion(s) of the component may be engaged with the mounting portion(s) of the rail(s) by aligning the mounting portions with one another and then translating the corresponding mounting portion(s) of the component toward the mounting portion(s) of the rail(s). Once the mounting portions are engaged with one another, the component may be translated along the rail(s) to a desired position. One or more fasteners may then be used to secure the corresponding mounting portion(s) of the component in the desired position along the rail(s). While lateral protrusions on each rail mounting portion and lateral recesses within each corresponding mounting portion of the component are disclosed above, in certain embodiments, lateral recesses may be formed within at least one rail mounting portion and lateral protrusions may extend from at least one corresponding component mounting portion. The rail(s) may support the load (e.g., weight) of the component while the surface-mounted vehicle is coupled to any suitable surface (e.g., wall, ceiling, stage, etc.).

In the illustrated embodiment, the component includes a light 24 configured to illuminate a portion of the performance environment. As illustrated, each rail of the rail coupling system 34 couples the light 24 to the surface-mounted vehicle 14, thereby enabling the surface-mounted vehicle 14 to support the load of the light 24 on any suitable surface within the performance environment. In addition, the light 24 is configured to receive electrical power via the electrical connectors of the rail coupling system 34. The surface-mounted vehicle 14 is configured to provide sufficient electrical power to the light 24 to enable the light to emit light at a desired intensity. Furthermore, in certain embodiments, the light may be controlled via one or more data connectors of the rail coupling system 34. For example, the light 24 may be configured to emit light at various intensities and/or colors. The light may receive a control signal via the data connector(s) of the rail coupling system 34, in which the control signal is indicative of a desired intensity/color, and the light may emit light at the desired intensity/color in response to receiving the control signal. While a light is coupled to the rail coupling system in the illustrated embodiment, in other embodiments, another suitable component may be coupled to the rail coupling system, such as a speaker, an animated figure, a winch, a display, a projector, a fog machine, a theatrical laser assembly, or a movable wall, among other suitable components.

In the illustrated embodiment, the surface assembly 28 includes a first electrical conductor 42 and a second electrical conductor 44. In addition, the surface-mounted vehicle 14 includes a third electrical conductor in contact with the first electrical conductor 42 and a fourth electrical conductor in contact with the second electrical conductor 44. The electrical conductors are configured to facilitate transfer of electrical power to the component (e.g., the light 24) via the electrical connectors of the rail coupling system. For example, in certain embodiments, the first and second electrical conductors may have opposite polarity to provide direct current (DC) electrical power to the surface-mounted vehicle. Furthermore, in certain embodiments, one of the first or second electrical conductor may provide alternating current (AC) electrical power to the surface-mounted vehicle, and the other of the first or second electrical conductor may function as a ground. The first and second electrical conductors may include a strip of electrically conductive material (e.g., wire, electrically conductive ink, etc.) extending along any suitable direction. In embodiments in which the surface assembly includes ferromagnetic structure(s), an insulator (e.g., non-conductive sheet of material, etc.) may be positioned between the first and second electrical conductors and the ferromagnetic structure(s). In addition, each of the third and fourth electrical conductors may include a brush, a roller, or any other suitable structure configured to engage the respective first/second electrical conductor, thereby facilitating electrical power transfer from the surface assembly 28 to the surface-mounted vehicle. While the surface assembly includes two electrical conductors in the illustrated embodiment, in other embodiments, the surface assembly may include more or fewer electrical conductors (e.g., 1, 3, 4, 5, 6, 7, 8, 9, 10, or more). For example, in certain embodiments, the surface-mounted vehicle may be configured to receive electrical power from a single conductor of the surface assembly, and/or individual or pairs of electrical conductors may be distributed throughout the surface assembly to enable the surface-mounted vehicle to receive electrical power while positioned in a variety of locations on the surface assembly.

While the surface-mounted vehicle 14 is configured to receive electrical power via electrical conductors in the illustrated embodiment, in other embodiments, the surface-mounted vehicle may receive the electrical power via an inductive power transfer system. For example, the surface assembly may include an inductive transmitter, and the surface-mounted vehicle may include an inductive receiver. The inductive receiver may be configured to receive power from the inductive transmitter and to output the electrical power to the component (e.g., the light 24). Furthermore, in certain embodiments, the theatrical production system may include a combination of electrical conductors and an inductive power transfer system to facilitate power transfer to the surface-mounted vehicle. While electrical conductors and an inductive power transfer system are disclosed above, in certain embodiments, the theatrical production system may include any other suitable type(s) of power transfer system(s) (e.g., alone or in combination with the electrical conductors and/or the inductive power transfer system), such as electrical wire(s) extending to the surface-mounted vehicle or solar panel(s) coupled to the surface-mounted vehicle (e.g., which are configured to receive light emitted by the surface assembly), among other suitable power transfer systems.

In the illustrated embodiment, the surface assembly 28 includes a data conductor 46 extending along the surface of the ceiling 20. In addition, the surface-mounted vehicle 14 includes a corresponding data conductor configured to contact the data conductor 46 of the surface assembly 28. The data conductor 46 may include a strip of electrically conductive material (e.g., wire, electrically conductive ink, etc.) extending along any suitable direction. In embodiments in which the surface assembly includes ferromagnetic structure(s), an insulator (e.g., non-conductive sheet of material, etc.) may be positioned between the data conductor and the ferromagnetic structure(s). In addition, the corresponding data conductor may include a brush, a roller, or any other suitable structure configured to engage the data conductor on the surface assembly, thereby establishing a communication link between a remote controller and the surface-mounted vehicle/component.

In certain embodiments, the remote controller may output a control signal to the propulsion system of the surface-mounted vehicle 14, and the propulsion system may receive the control signal via the data conductors 46. In addition, the remote controller may output a control signal to the light 24 via the data conductors, and the light may receive the control signal via the data conductors and the data connector(s) of the rail coupling system. While the surface-mounted vehicle and the component are configured to receive control signal(s) via the data conductors in the illustrated embodiment, in other embodiments, the surface-mounted vehicle and/or the component may be configured to receive control signal(s) via other suitable communication link(s) (e.g., alone or in combination with the data conductors). For example, in certain embodiments, the surface-mounted vehicle and/or the component may include a wireless receiver configured to receive control signal(s), and/or the surface-mounted vehicle and/or the component may include a wired receiver configured to receive control signal(s). Furthermore, in certain embodiments, the surface-mounted vehicle and the component may not be configured to receive control signal(s). In such embodiments, instructions may be stored within a memory of a surface-mounted vehicle controller and/or a memory of a component controller.

In certain embodiments, at least one of the third electrical conductor or the fourth electrical conductor of the surface-mounted vehicle 14 is formed on/by a respective wheel of the surface-mounted vehicle. For example, a first wheel may be formed from an electrically conductive material to form the third conductor, and a second wheel may be formed from an electrically conductive material to form the fourth conductor. The first and second wheels may contact the first and second electrical conductors, respectively, to facilitate transfer of electrical power to the surface-mounted vehicle. Additionally or alternatively, the data conductor of the surface-mounted vehicle may be formed on/by a respective wheel of the surface-mounted vehicle. For example, a wheel may be formed from an electrically conductive material to form the data conductor. The wheel may contact the data conductor of the surface assembly to establish the communication link between the remote controller and the surface-mounted vehicle/component. While forming a wheel from electrically conductive material is disclosed above, in certain embodiments, the wheel may be formed from a suitable non-conductive material, and the wheel may include an electrical conductor disposed about the non-conductive material to form the contact surface of the wheel.

FIG. 3 is a block diagram of an embodiment of a theatrical production system 12 that may be employed within the performance environment of FIG. 1, in which the theatrical production system 12 includes a surface-mounted vehicle 14 and a surface assembly 28. In the illustrated embodiment, the surface assembly 28 includes the ceiling 20. However, in other embodiments, the surface assembly may include a wall or a stage, as previously discussed above with reference to FIG. 1.

As previously discussed, the surface-mounted vehicle 14 includes a mounting system 32 configured to couple the surface-mounted vehicle 14 to the surface assembly 28. In the illustrated embodiment, the mounting system 32 includes a magnetic mounting system 48 having multiple magnets 50 coupled to the body 30 of the surface-mounted vehicle 14. While the magnetic mounting system 48 includes two magnets 50 in the illustrated embodiment, in other embodiments, the magnetic mounting system 48 may include more or fewer magnets (e.g., 0, 1, 3, 4, 5, 6, 7, 8, or more). Furthermore, in the illustrated embodiment, the surface assembly 28 includes multiple corresponding magnets 52. The magnets 50 of the magnetic mounting system 48 may be magnetically attracted to the magnets 52 of the surface assembly 28, thereby coupling the surface-mounted vehicle 14 to the surface assembly 28. While two magnets 52 of the surface assembly 28 are shown in the illustrated embodiment, the surface assembly may include a significant number of magnets distributed throughout the surface assembly 28, thereby maintaining a magnetic coupling between the surface-mounted vehicle 14 and the surface assembly 28 while the surface-mounted vehicle is positioned in multiple locations on the surface assembly 28.

In the illustrated embodiment, the magnets 50 of the magnetic mounting system 48 are separated from the magnets 52 of the surface assembly 28 by a gap 54 to reduce friction between the surface-mounted vehicle 14 and the surface assembly 28, thereby facilitating movement of the surface-mounted vehicle 14 along the surface assembly 28. As illustrated, wheels 56 of the surface-mounted vehicle 14 extend between the body 30 and the surface assembly 28 to establish the gap 54. Furthermore, in the illustrated embodiment, the wheels 56 establish a gap 58 between the body 30 of the surface-mounted vehicle 14 and a surface 60 (e.g., bottom surface of the ceiling 20) to reduce friction between the surface-mounted vehicle 14 and the surface assembly 28. The gap 54 between the respective magnets and/or the gap 58 between the surface-mounted vehicle body 30 and the surface 60 may be selected (e.g., by positioning the wheels 56 relative to the body 30, by positioning the surface assembly magnets 52 relative to the surface 60, by positioning the surface-mounted vehicle magnets 50 relative to the body 30, etc.) to establish a magnetic attraction sufficient to couple the surface-mounted vehicle 14 to the surface assembly 28 and to reduce friction between the surface-mounted vehicle 14 and the surface assembly 28. Furthermore, in certain embodiments, the theatrical production system may be configured such that the body of the surface-mounted vehicle contacts the surface of the surface assembly and/or such that the magnet(s) of the surface-mounted vehicle contact the magnet(s) of the surface assembly. For example, the wheels may be omitted, and/or the surface-mounted vehicle and/or the surface assembly may include low-friction pad(s) to facilitate movement of the surface-mounted vehicle along the surface assembly.

In the illustrated embodiment, the magnets 50 of the magnetic mounting system 48 include electromagnets. Accordingly, the electromagnets are configured to receive electrical power from an electrical power source to establish the magnetic attraction between the surface-mounted vehicle and the surface assembly. In the illustrated embodiment, the electromagnetics are communicatively coupled to a controller 62 of the surface-mounted vehicle 14. The controller 62 is configured to control the electrical power supplied to the electromagnets, thereby controlling the magnetic attraction between the surface-mounted vehicle 14 and the surface assembly 28.

In certain embodiments, the controller 62 is an electronic controller having electrical circuitry configured to control the output of the electromagnets. In the illustrated embodiment, the controller 62 includes a processor, such as the illustrated microprocessor 64, and a memory device 66. The controller 62 may also include one or more storage devices and/or other suitable components. The processor 64 may be used to execute software, such as software for controlling the output of the electromagnetics, and so forth. Moreover, the processor 64 may include multiple microprocessors, one or more "general-purpose" microprocessors, one or more special-purpose microprocessors, and/or one or more application specific integrated circuits (ASICs), or some combination thereof. For example, the processor 64 may include one or more reduced instruction set (RISC) processors.

The memory device 66 may include a volatile memory, such as random access memory (RAM), and/or a nonvolatile memory, such as read-only memory (ROM). The memory device 66 may store a variety of information and may be used for various purposes. For example, the memory device 66 may store processor-executable instructions (e.g., firmware or software) for the processor 64 to execute, such as instructions for controlling the electromagnets, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the electromagnets, etc.), and any other suitable data.

The controller 62 may control the output of the electromagnets based on a weight of the component coupled to the surface-mounted vehicle 14, the angle of the surface 60 relative to a ground plane, other suitable factors, or a combination thereof. In certain embodiments, at least one magnet 50 may include a combination of electromagnet(s) and permanent magnet(s). For example, the permanent magnet(s) may apply a first portion of the magnetic attraction, and the electromagnet(s) may apply a second portion of the magnetic attraction (e.g., which may be controlled by the controller). Additionally or alternatively, the permanent magnet(s) may function as a backup to the electromagnet(s) in the event of a partial or complete loss of electrical power. For example, permanent magnet(s) may be biased toward the surface assembly (e.g., by a spring, by resilient material, etc.), and the electromagnet(s) may be configured to drive the permanent magnet away from the surface assembly while the electromagnetic is activated (e.g., via a linkage assembly, etc.). In the event of a partial or complete loss of electrical power, the electromagnet(s) may not provide sufficient force to overcome the bias of the permanent magnet(s) toward the surface assembly. As a result, the permanent magnet(s) may move toward the surface assembly, thereby increasing the magnetic attraction between the permanent magnet(s) and the surface assembly (e.g., magnet(s) and/or ferromagnetic material of the surface assembly). Accordingly, the permanent magnet(s) (e.g., one or more permanent magnets per magnet 50) may provide sufficient magnetic attraction to maintain the coupling between the surface-mounted vehicle and the surface assembly in the event of a partial or complete loss of electrical power. Furthermore, in certain embodiments, at least one magnet 50 may include only permanent magnet(s). While the electromagnets are electrically coupled to the controller in the illustrated embodiment, in other embodiments, the electromagnets may be directly electrically coupled to an electrical power system, such as the inductive receiver and/or a battery.

While the surface assembly includes magnets in the illustrated embodiment, in other embodiments, the surface assembly may include one or more ferromagnetic structures (e.g., alone or in combination with magnet(s)) to establish the magnetic attraction between the magnet(s) of the surface-mounted vehicle and the surface assembly. Furthermore, while the magnetic mounting system 48 of the surface-mounted vehicle 14 includes magnets in the illustrated embodiment, in other embodiments, the magnetic mounting system may include one or more ferromagnetic structures (e.g., alone or in combination with magnet(s)) to establish the magnetic attraction between the magnets of the surface assembly and the surface-mounted vehicle. In addition, in certain embodiments, at least one wheel may be magnetic and/or may include a ferromagnetic structure (e.g., the wheel may be formed from a ferromagnetic material, etc.). In such embodiments, the wheel(s) may form at least a portion of the magnetic mounting system, and one or more separate magnets and/or one or more separate ferromagnetic structures of the surface-mounted vehicle may be omitted (e.g., the wheel may establish the magnetic coupling to the surface assembly without any additional magnets/ferromagnetic structures). While the mounting system 32 includes the magnetic mounting system 48 in the illustrated embodiment, in other embodiments, the mounting system may include any other suitable device(s) and/or system(s) configured to couple the surface-mounted vehicle to the surface assembly (e.g., alone or in combination with the magnetic mounting system), such as one or more of a rail/track system, a slot/protrusion system, or a cable/strap system. For example, in certain embodiments, a cable/strap system may be used to substantially reduce or eliminate the possibility of the surface-mounted vehicle falling in the event that the attractive force provided by the magnetic mounting system is insufficient to couple the surface-mounted vehicle to the surface assembly.

Furthermore, the surface-mounted vehicle 14 includes a propulsion system 68 configured to move the surface-mounted vehicle 14 along the surface assembly 28. In the illustrated embodiment, the propulsion system 68 includes electric motors 70 configured to drive the respective wheels 56 to rotate. In addition, each wheel 56 is rotatably coupled to the body 30 of the surface-mounted vehicle 14 and engaged with the surface 60 of the surface assembly 28. Accordingly, the electric motors 70 may drive respective wheels to rotate, thereby propelling the surface-mounted vehicle 14 along the surface assembly 28. While the propulsion system 68 includes two motors 70 in the illustrated embodiment, in other embodiments, the propulsion system may include more or fewer motors (e.g., 0, 1, 3, 4, 5, 6, 7, 8, or more). For example, the propulsion system may include one motor for each wheel (e.g., of at least a portion of the wheels), thereby driving each wheel to rotate. Additionally or alternatively, at least one wheel may be driven by multiple motors, and/or at least two wheels may be driven by a single motor. Furthermore, while the propulsion system 68 includes electric motor(s) 70 in the illustrated embodiment, in other embodiments, the propulsion system may include any other suitable types of motor (e.g., alone or in addition to the electric motor(s)), such as hydraulic motor(s) and/or pneumatic motor(s). While each wheel 56 is driven to rotate by a motor 70 in the illustrated embodiment, in other embodiments, at least one wheel may not be driven by a motor (e.g., the wheel may passively rotate along the surface).

In the illustrated embodiment, each motor 70 is communicatively coupled to the controller 62, and the controller 62 is configured to control rotation of each motor 70. Accordingly, the controller 62 may control the rotational speed of the wheels 56, thereby controlling the speed of the surface-mounted vehicle 14 along the surface assembly 28. Furthermore, in certain embodiments, the controller 62 is configured to control the direction of motion of the surface-mounted vehicle 14 by instructing the motors 70 to drive the wheels 56 at different rotational speeds and/or in different rotational directions. For example, the controller 62 may instruct a first motor 70 to drive a first wheel 56 to rotate at a first rotational speed, and the controller 62 may instruct a second motor 70 to drive a second wheel 56 to rotate at a second rotational speed, different than the first rotational speed, to control the direction of movement of the surface-mounted vehicle 14. Additionally or alternatively, the propulsion system may include pivotable wheel(s) (e.g., driven wheel(s) or non-driven wheel(s)) and actuator(s) (e.g., electric actuator(s), pneumatic actuator(s), hydraulic actuator(s), etc.) configured to drive the pivotable wheel(s) to pivot, thereby steering the surface-mounted vehicle along a target path. For example, the actuator(s) may be communicatively coupled to the controller, and the controller may control the actuator(s) to control the direction of movement of the surface-mounted vehicle. While wheels are disclosed above, the propulsion system may include any other suitable device(s)/system(s) configured to move the surface-mounted vehicle along the surface assembly (e.g., alone or in combination with wheel(s)), such as a gear/rack assembly and/or a cable/pulley assembly.

In the illustrated embodiment, the surface-mounted vehicle 14 includes an inductive power system 72 configured to receive power from an inductive power source 74 of the surface assembly 28 and to output electrical power (e.g., to the controller, to the motor(s), to the component, to the electromagnet(s), etc.). As illustrated, the inductive power source 74 of the surface assembly 28 includes an inductive transmitter 76, and the inductive power system 72 of the surface-mounted vehicle 14 includes an inductive receiver 78. The inductive receiver 78 is configured to receive power from the inductive transmitter 76 and to output the electrical power. In the illustrated embodiment, the inductive receiver 78 is electrically coupled to the controller 62, and the controller 62 is configured to control flow of electrical power from the inductive receiver 78 to the motor(s), to the electromagnet(s), and to the component via the rail coupling system 34. However, in other embodiments, at least one element (e.g., one or more motors, one or more electromagnets, the component, etc.) may be directly electrically coupled to the inductive receiver.

While the surface-mounted vehicle 14 includes the inductive power system 72 in the illustrated embodiment, in other embodiments, the surface-mounted vehicle may receive electrical power via other and/or additional electrical connections. For example, in certain embodiments, the surface-mounted vehicle may receive electrical power from electrical conductor(s) of the surface assembly, as disclosed above with reference to FIG. 2. For example, in certain embodiments, the theatrical production system may include a combination of electrical conductors and an inductive power system/inductive power source to facilitate power transfer to the surface-mounted vehicle. Furthermore, in certain embodiments, the theatrical production system may include any other suitable type(s) of power transfer system(s) (e.g., alone or in combination with the electrical conductors and/or the inductive power system/inductive power source), such as electrical wire(s) extending to the surface-mounted vehicle and/or solar panel(s) coupled to the surface-mounted vehicle (e.g., which are configured to receive light emitted by the surface assembly), among other suitable power transfer systems.

In the illustrated embodiment, the surface-mounted vehicle 14 includes a battery 80 configured to provide electrical power (e.g., continuously, on-demand, etc.) to certain element(s) of the surface-mounted vehicle 14 and/or to the component coupled to the surface-mounted vehicle. For example, the battery 80 may provide electrical power to the electromagnet(s) in the event of a partial or complete interruption of external electrical power to the surface-mounted vehicle 14. In the illustrated embodiment, the battery 80 is electrically coupled to the controller 62, and the controller 62 is configured to control flow of electrical power from the battery 80 to the motor(s), to the electromagnet(s), and to the component via the rail coupling system 34. For example, the controller 62 may detect an interruption in external electrical power (e.g., due to misalignment of the inductive receiver 78 and the inductive transmitter 76, due to misalignment of conductor(s) of the surface-mounted vehicle and conductor(s) of the surface assembly, etc.) and, in response, provide electrical power from the battery 80 to one or more elements of the surface-mounted vehicle/component. Furthermore, in certain embodiments, at least one element (e.g., one or more motors, one or more electromagnets, the component, etc.) may be directly electrically coupled to the battery. While the surface-mounted vehicle 14 includes a single battery 80 in the illustrated embodiment, in other embodiments, the surface-mounted vehicle may include more or fewer batteries (e.g., 0, 2, 3, 4, or more). For example, in certain embodiments, at least one element of the surface-mounted vehicle/component may be electrically coupled to a respective battery. Furthermore, in certain embodiments, the battery may be omitted.

In the illustrated embodiment, the surface-mounted vehicle 14 includes a communication system 82 communicatively coupled to the controller 62, in which the communication system 82 is configured to receive instructions indicative of controlling the surface-mounted vehicle 14 and/or the component coupled to the surface-mounted vehicle. In the illustrated embodiment, the communication system 82 includes a data receiver 84 configured to communicatively couple to a data transmitter 86 of the surface assembly 28. The data transmitter 86 may output a wireless signal indicative of instructions to the data receiver 84, and the data receiver 84 may output a respective signal indicative of the instructions to the controller 62. The data transmitter 86 and the data receiver 84 may communicate using any suitable wireless frequency/frequencies and/or any suitable wireless communication protocol(s). For example, the data transmitter and the data receiver may communicate via a radio frequency signal, a microwave signal, an infrared signal, an optical signal, other suitable type(s) of wireless signal(s), or a combination thereof. In addition, the data transmitter and the data receiver may communicate via standard wireless protocol(s) (e.g., WiFi, Bluetooth, etc.) or propriety wireless protocol(s). The data transmitter 86 may be communicatively coupled to a remote control system (e.g., computer, server, tablet, etc.), and the remote control system may control operation of the surface-mounted vehicle/component (e.g., by providing instructions to move the surface-mounted vehicle to a target location on the surface assembly, by providing instructions to control operation of the component coupled to the surface-mounted vehicle by the rail coupling system, etc.). While a single data transmitter 86 is coupled to/is a component of the surface assembly 28 in the illustrated embodiment, in other embodiments, one or more data transmitters (e.g., alone or in combination with the data transmitter of the surface assembly) may be positioned at any suitable location(s) within the performance environment and/or remote from the performance environment.

While the communication system 82 includes a wireless data receiver 84 in the illustrated embodiment, in other embodiments, the communication system may include a wired connection to a remote control system (e.g., alone or in combination with the illustrated wireless connection). For example, in certain embodiments, the communication system may include a data conductor configured to contact a corresponding data conductor of the surface assembly, as disclosed above with reference to FIG. 2. Furthermore, in certain embodiments, the communication system may include another suitable wired connection to a remote control system (e.g., alone or in combination with the illustrated wireless connection and/or the conductors disclosed above with reference to FIG. 2), such as via electrical wire(s), via fiber optic cable(s), via other suitable wire(s)/cable(s), or a combination thereof. In certain embodiments, the surface-mounted vehicle may be configured to move to a data reception location (e.g., via instructions stored within the memory of the controller, in response to reception of a wireless signal, etc.) to receive instructions from a remote control system. For example, the surface-mounted vehicle may move to a location in which the data receiver is within range of the data transmitter, or the surface-mounted vehicle may move to a location in which a data conductor of the surface-mounted vehicle contacts a data conductor of the surface assembly. The instructions received while the surface-mounted vehicle is positioned at the data reception location may be stored within the memory of the surface-mounted vehicle controller. Furthermore, in certain embodiments, the communication system may be configured to output/transmit a signal to a remote control system (e.g., indicative of a position of the surface-mounted vehicle, indicative of a speed of the surface-mounted vehicle, indicative of a state of the component coupled to the surface-mounted vehicle via the rail coupling system, etc.).

Furthermore, in certain embodiments, the surface-mounted vehicle may include a sensor assembly communicatively coupled to the controller. The sensor assembly may include a position sensor (e.g., global positioning system (GPS) sensor, inertial measurement unit (IMU) sensor, wheel rotation sensor, etc.), an object detection sensor (e.g., LIDAR sensor, RADAR sensor, ultrasonic sensor, inductive sensor, capacitive sensor, etc.), another suitable sensor (e.g., light detection sensor, sound detection sensor, camera, etc.), or a combination thereof. The controller may control operation of the surface-mounted vehicle based on feedback from the sensor(s). For example, the position of the surface-mounted vehicle may be controlled based on feedback from the position sensor, and/or the surface-mounted vehicle may be controlled to avoid obstacles based on feedback from the object detection sensor.

As previously discuss, the surface-mounted vehicle 14 includes a rail coupling system 34 configured to couple a component 88 to the surface-mounted vehicle 14. For example, the rail coupling system 34 may include a first rail and a second rail substantially parallel to one another, as discussed above with reference to FIG. 2. The rail coupling system 34 includes multiple electrical connectors disposed along at least one of the rails, in which the electrical connectors are configured to provide electrical power to the component. In the illustrated embodiment, the electrical connector(s) establish an electrical connection 90 between the controller 62 of the surface-mounted vehicle 14 and a controller 92 of the component 88. The controller 92 of the component 88 is configured to control flow of electrical power from the surface-mounted vehicle controller 62 to certain elements of the component 88. However, in other embodiments, at least one element of the component may be electrically coupled directly to the electrical connector(s) (e.g., bypassing the component controller). Furthermore, in certain embodiments, the component controller and/or at least one element of the component may receive electrical power directly from an electrical power system of the surface-mounted vehicle (e.g., the battery, the inductive receiver, etc.), thereby bypassing the surface-mounted vehicle controller.

In certain embodiments, the controller 92 is an electronic controller having electrical circuitry configured to control certain element(s) of the component 88. In the illustrated embodiment, the controller 92 includes a processor, such as the illustrated microprocessor 94, and a memory device 96. The controller 92 may also include one or more storage devices and/or other suitable components. The processor 94 may be used to execute software, such as software for controlling certain element(s) of the component 88, and so forth. Moreover, the processor 94 may include multiple microprocessors, one or more "general-purpose" microprocessors, one or more special-purpose microprocessors, and/or one or more application specific integrated circuits (ASICs), or some combination thereof. For example, the processor 94 may include one or more reduced instruction set (RISC) processors.

The memory device 96 may include a volatile memory, such as random access memory (RAM), and/or a nonvolatile memory, such as read-only memory (ROM). The memory device 96 may store a variety of information and may be used for various purposes. For example, the memory device 96 may store processor-executable instructions (e.g., firmware or software) for the processor 94 to execute, such as instructions for controlling certain element(s) of the component 88, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling certain element(s) of the component, etc.), and any other suitable data.

Furthermore, in the illustrated embodiment, the rail coupling system 34 includes one or more data connectors disposed on at least one rail. The data connector(s) are configured to establish a communication link 98 between the controller 62 of the surface-mounted vehicle 14 and the controller 92 of the component 88, thereby facilitating control of the component 88. In the illustrated embodiment, the controller 92 is communicatively coupled to actuators 100, and the actuators 100 are configured to control an animated FIG. 22 (e.g., puppet). The controller 92 and the actuators 100 are part of a control module 101 coupled to the rail coupling system 34, and the animated FIG. 22 (e.g., actuator component 103) is coupled to the control module 101. However, in other embodiments, the component coupled to the rail coupling system may have another suitable structural configuration. The controller 62 of the surface-mounted vehicle may provide instructions to the controller 92 of the component 88 to control the animated FIG. 22, and the controller 92 of the component 88 may instruct the actuators 100 to control the animated FIG. 22 based on the instructions. While the controller 62 of the surface-mounted vehicle 14 is communicatively coupled to the actuators 100 via the controller 92 of the component 88 in the illustrated embodiment, in other embodiments, the surface-mounted vehicle controller 62 may be directly communicatively coupled to the actuators 100. In such embodiments, the controller of the component may be omitted. Furthermore, in certain embodiments, the controller 92 may be communicatively coupled to other suitable communication system(s) (e.g., a communication system of the component, the communication system 82 of the surface-mounted vehicle, data conductor(s) of the surface-mounted vehicle, etc.). In such embodiments, the controller 92 may receive instructions directly from the other communication system(s) (e.g., alone or in combination with receiving instructions from the surface-mounted vehicle controller).

While the component 88 includes two actuators 100 in the illustrated embodiment, in other embodiments, the component may include more or fewer actuators (e.g., 0, 1, 3, 4, 5, 6, or more). Furthermore, while an animated figure is coupled to the rail coupling system 34 in the illustrated embodiment, in other embodiments, another suitable component may be coupled to the rail coupling system, such as a speaker, a light, a winch, a display, a projector, a fog machine, a theatrical laser assembly, or a movable wall, among other suitable components. In such embodiments, the controller of the surface-mounted vehicle and/or the controller of the component may control operation of one or more functions of the component.

FIG. 4 is a block diagram of another embodiment of a theatrical production system 102 that may be employed within the performance environment of FIG. 1, in which the theatrical production system 102 includes a surface-mounted vehicle 104 and a surface assembly 28. In the illustrated embodiment, the surface assembly 28 includes the ceiling 20. However, in other embodiments, the surface assembly may include a wall or a stage, as previously discussed above with reference to FIG. 1.

In the illustrated embodiment, the surface-mounted vehicle 104 includes a first portion 106 and a second portion 108. As illustrated, the first portion 106 is positioned on a first side 110 of the surface assembly 28 (e.g., the top side of the surface assembly), and the second portion 108 is positioned on a second side 112 of the surface assembly (e.g., the bottom side of the surface assembly), opposite the first side 110. In addition, the first portion 106 of the surface-mounted vehicle 104 includes the propulsion system 68, and the second portion 108 of the surface-mounted vehicle 104 includes the body 30 and the rail coupling system 34. Furthermore, the mounting system 114 is distributed between the first and second portions to couple the surface-mounted vehicle 104 to the surface assembly 28.

In the illustrated embodiment, the mounting system 114 includes magnets 50 coupled to a body 116 of the first portion 106 of the surface-mounted vehicle 104 and magnets 50 coupled to the body 30 of the second portion 108 of the surface-mounted vehicle 104. The magnets 50 of the first portion 106 may be substantially aligned with the magnets 50 of the second portion 108, thereby establishing a magnetic attraction between the first and second portions of the surface-mounted vehicle 104. Accordingly, while the surface-mounted vehicle 104 is positioned at the ceiling 20, as illustrated, the weight of the first portion 106 of the surface-mounted vehicle 104 may be supported by the surface assembly 28, and the weight of the second portion 108 of the surface-mounted vehicle 104 may be supported by the magnetic attraction to the first portion 106 of the surface-mounted vehicle 104. In the illustrated embodiment, each magnet 50 includes only permanent magnet(s). Accordingly, each magnet is not electrically coupled to the controller or a suitable electrical power system. However, in other embodiments, at least one magnet of the mounting system may include at least one electromagnet (e.g., alone or in combination with one or more permanent magnets). In such embodiments, the electromagnet(s) may be electrically coupled to the controller and/or to a suitable electrical power system (e.g., inductive receiver, electrical conductor(s) configured to receive electrical power from the surface assembly, etc.).

While the first portion 106 of the surface-mounted vehicle 104 includes two magnets 50 and the second portion 108 of the surface-mounted vehicle 104 includes two magnets in the illustrated embodiment, in other embodiments, at least one portion of the surface-mounted vehicle may include more or fewer magnets (e.g., 0, 1, 3, 4, 5, 6, 7, 8, or more). For example, each portion of the surface-mounted vehicle may have the same number of magnets, and each magnet of one portion may be substantially aligned with a respective magnet of the other portion. Furthermore, in certain embodiments, at least one portion of the surface-mounted vehicle may include one or more ferromagnetic structures (e.g., alone or in combination with the magnet(s)). For example, in certain embodiments, the first portion of the surface-mounted vehicle may include one or more ferromagnetic structures configured to interact with one or more respective magnets of the second portion of the surface-mounted vehicle, and/or the second portion of the surface-mounted vehicle may include one or more ferromagnetic structures configured to interact with one or more respective magnets of the first portion of the surface-mounted vehicle. Furthermore, in certain embodiments, at least one wheel of one portion of the surface-mounted vehicle may be magnetic. In such embodiments, at least one corresponding wheel of the other portion may be magnetic and/or may include a ferromagnetic structure (e.g., the wheel(s) may be formed of ferromagnetic material, etc.). Additionally or alternatively, at least one magnetic wheel of one portion may interact with a magnet or ferromagnetic structure of the other portion, and/or at least one wheel having a ferromagnetic structure of one portion may interact with a magnet of the other portion.

While the mounting system 114 includes magnets 50 in the illustrated embodiment, in other embodiments, the mounting system may include a physical structure extending between the first and second portions and configured to couple the surface-mounted vehicle to the surface assembly. For example, in certain embodiments, one or more cables and/or one or more rods may extend between the first portion of the surface-mounted vehicle and the second portion of the surface-mounted vehicle. In such embodiments, the cable(s)/rod(s) may extend through openings in the surface assembly (e.g., to support the weight of the second portion of the surface-mounted vehicle while the surface-mounted vehicle is positioned at the ceiling). Furthermore, in certain embodiments, the second portion of the surface-mounted vehicle may be coupled to the surface assembly by one or more suitable systems (e.g., alone or in combination with the coupling to the first portion of the surface-mounted vehicle), such as the systems disclosed above with reference to FIG. 3 (e.g., magnetic mounting system, rail/track system, slot/protrusion system, cable system, other suitable system(s), or a combination thereof). Additionally or alternatively, the first portion of the surface-mounted vehicle may be coupled to the surface assembly by one or more suitable systems (e.g., alone or in combination with the coupling to the second portion of the surface-mounted vehicle), such as the systems disclosed above with reference to FIG. 3 (e.g., magnetic mounting system, rail/track system, slot/protrusion system, cable system, other suitable system(s), or a combination thereof).

In the illustrated embodiment, the propulsion system 68 is disposed within the body 116 of the first portion 106 of the surface-mounted vehicle 104. Furthermore, in the illustrated embodiment, the propulsion system 68 includes electric motors 70 configured to drive the respective wheels 56 to rotate. In addition, each wheel 56 is rotatably coupled to the body 116 of the first portion 106 of the surface-mounted vehicle 104 and engaged with a surface 118 of the surface assembly 28. Accordingly, the electric motors 70 may drive respective wheels to rotate, thereby propelling the surface-mounted vehicle 104 along the surface assembly 28. The motors 70 may be controlled in the manner disclosed above with reference to FIG. 3. In addition, any of the propulsion system variations disclosed above with reference to FIG. 3 may be applied to the illustrated propulsion system (e.g., number of motors, type of motors, inclusion of pivotable wheel(s), etc.).

In the illustrated embodiment, movement of the first portion 106 of the surface-mounted vehicle 104 is configured to drive movement of the second portion 108 of the surface-mounted vehicle 104 due to the coupling (e.g., magnetic coupling) between the portions. For example, as the propulsion system 68 drives the first portion 106 of the surface-mounted vehicle 104 along the surface assembly 28, the magnetic coupling between the first and second portions causes the second portion 108 of the surface-mounted vehicle 104 to move along the surface assembly 28. In certain embodiments, the second portion of the surface-mounted vehicle may include a propulsion system configured to move the second portion of the surface-mounted vehicle along the surface assembly. For example, in certain embodiments, the propulsion system of the first portion of the surface-mounted vehicle may be omitted, and the coupling between the first and second portions may cause the first portion to move along the surface assembly in response to movement of the second portion along the surface assembly. Furthermore, in certain embodiments, the first portion of the surface-mounted vehicle may include a first propulsion system, and the second portion of the surface-mounted vehicle may include a second propulsion system.

In the illustrated embodiment, the surface-mounted vehicle 104 includes an internal power transfer system 120 configured to transfer electrical power from the first portion 106 of the surface-mounted vehicle 104 to the second portion 108 of the surface-mounted vehicle 104. In the illustrated embodiment, the internal power transfer system 120 includes an inductive transmitter 122 coupled to the body 116 of the first portion 106 of the surface-mounted vehicle 104. In addition, the internal power transfer system 120 includes an inductive receiver 124 coupled to the body 30 of the second portion 108 of the surface-mounted vehicle 104. The inductive transmitter 122 is configured to output power to the inductive receiver 124, and the inductive receiver 124 is configured to receive the power from the inductive transmitter 122 and to output electrical power to the component (e.g., the light 24) coupled to the rail coupling system 34. In the illustrated embodiment, the inductive transmitter 122 is electrically coupled to the controller 62, and the controller 62 is configured to control the output of the inductive transmitter 122, thereby controlling the power transfer to the component (e.g., the light 24) coupled to the rail coupling system 34. While the inductive transmitter 122 is electrically coupled to the controller 62 in the illustrated embodiment, in other embodiments, the inductive transmitter may be directly electrically coupled to an electrical power system (e.g., battery, electrical conductor(s), inductive receiver of the surface assembly-to-surface-mounted vehicle inductive power system, etc.).

The surface-mounted vehicle 104 may include any suitable system configured to receive electrical power from an external power source, such as the power transfer systems disclosed above with reference to FIGS. 2-3 (e.g., via wire(s), via electrical conductors, via an inductive power system, via other suitable system(s), or a combination thereof). For example, in certain embodiments, one or more electrical conductors may be disposed on the surface 118 of the surface assembly 28 facing the first portion 106 of the surface-mounted vehicle 104, and/or one or more electrical conductors may be disposed on the surface 60 of the surface assembly 28 facing the second portion 108 of the surface-mounted vehicle 104. In such embodiments, the first portion of the surface-mounted vehicle and/or the second portion of the surface-mounted vehicle may include corresponding electrical conductor(s) configured to contact the electrical conductor(s) of the surface assembly, thereby facilitating electrical power transfer from an external source to the first portion and/or to the second portion of the surface-mounted vehicle. Furthermore, in certain embodiments, the surface assembly may include inductive transmitter(s), and the surface-mounted vehicle (e.g., the first portion and/or the second portion of the surface-mounted vehicle) may include inductive receiver(s), thereby facilitating power transfer from an external source to the surface-mounted vehicle. In addition, in certain embodiments, one or more electrical conductors may be disposed on a surface positioned on an opposite side of the first portion of the surface-mounted vehicle from the surface assembly. In such embodiments, the first portion of the surface-mounted vehicle may include corresponding electrical conductor(s) configured to contact the electrical conductor(s) on the surface, thereby facilitating electrical power transfer from an external source to the first portion of the surface-mounted vehicle. In certain embodiments, electrical power may be received by the second portion of the surface-mounted vehicle and transferred to the first portion of the surface-mounted vehicle by the internal power transfer system. Furthermore, in certain embodiments, electrical power may be transferred from an external power source to each portion of the surface-mounted vehicle. In such embodiments, the internal power transfer system may be omitted.

In the illustrated embodiment, the battery 80 is coupled to the body 116 of the first portion 106 of the surface-mounted vehicle 104. As previously discussed, the battery 80 is configured to provide electrical power (e.g., continuously, on-demand, etc.) to certain element(s) of the surface-mounted vehicle 104 and/or to the component coupled to the surface-mounted vehicle. For example, the battery 80 may provide electrical power to the electromagnet(s) in the event of a partial or complete interruption of external electrical power to the surface-mounted vehicle 104. In the illustrated embodiment, the battery 80 is electrically coupled to the controller 62, and the controller 62 is configured to control flow of electrical power from the battery 80 to the motor(s) 70, to the inductive transmitter 122, to other element(s) of the surface-mounted vehicle, or a combination thereof. In certain embodiments, at least one element (e.g., one or more motors, the inductive transmitter, etc.) may be directly electrically coupled to the battery. Because the battery 80 is coupled to the body 116 of the first portion 106 of the surface-mounted vehicle 104 and the first portion 106 of the surface-mounted vehicle 104 is supported by the surface assembly 28 (e.g., while the surface-mounted vehicle is positioned at the ceiling), a large battery may be utilized (e.g., as compared to a battery coupled to the second portion of the surface-mounted vehicle, which is supported by magnet(s)). While the surface-mounted vehicle 104 includes a single battery 80 in the illustrated embodiment, in other embodiments, the surface-mounted vehicle may include more or fewer batteries (e.g., 0, 2, 3, 4, or more). For example, in certain embodiments, at least one element of the surface-mounted vehicle/component may be electrically coupled to a respective battery. Furthermore, while the battery is coupled to the body of the first portion of the surface-mounted vehicle in the illustrated embodiment, in other embodiments, a battery may be coupled to the body of the second portion of the surface-mounted vehicle (e.g., alone or in combination with the battery coupled to the body of the first portion of the surface-mounted vehicle). In addition, in certain embodiments, the battery may be omitted.

In the illustrated embodiment, the communication system 82, which is communicatively coupled to the controller 62, is coupled to the body 116 of the first portion 106 of the surface-mounted vehicle 104. As previously discussed, the communication system 82 is configured to receive instructions indicative of controlling the surface-mounted vehicle 104. In the illustrated embodiment, the communication system 82 includes a data receiver 84 configured to communicatively couple to a data transmitter (e.g., of the surface assembly 28). The data transmitter may output a wireless signal indicative of instructions to the data receiver 84, and the data receiver 84 may output a respective signal indicative of the instructions to the controller 62. While the communication system 82 includes a wireless data receiver 84 in the illustrated embodiment, in other embodiments, the communication system may include a wired connection to a remote control system (e.g., alone or in combination with the illustrated wireless connection). For example, in certain embodiments, the communication system may include a data conductor configured to contact a corresponding data conductor of the surface assembly, as disclosed above with reference to FIG. 2. In certain embodiments, the surface-mounted vehicle may be configured to move to a data reception location (e.g., via instructions stored within the memory of the controller, in response to reception of a wireless signal, etc.) to receive instructions from a remote control system. Furthermore, while the communication system is coupled to the body of the first portion of the surface-mounted vehicle in the illustrated embodiment, in other embodiments, the communication system may be coupled to the body of the second portion of the surface-mounted vehicle, or the communication system may be distributed between the first and second portions of the surface-mounted vehicle. For example, in certain embodiments, each portion of the surface-mounted vehicle may be configured to communicate with the remote control system.

In certain embodiments, the surface-mounted vehicle may include an internal communication system configured to facilitate communication between the first and second portions of the surface-mounted vehicle. For example, the internal communication system may include a first transmitter/receiver/transceiver coupled to the body of the first portion of the surface-mounted vehicle, and the internal communication system may include a second transmitter/receiver/transceiver coupled to the body of the second portion of the surface-mounted vehicle. By way of further example, the internal communication system may include a wired connection between the first and second portions of the surface-mounted vehicle. Furthermore, in certain embodiments, signals may be communicated between the first and second portions of the surface-mounted vehicle via conductor(s) extending through the surface assembly, in which respective conductor(s) of the first portion and respective conductor(s) of the second portion contact the conductor(s) of the surface assembly to establish a communication link between the first and second portions of the surface-mounted vehicle.

Furthermore, in certain embodiments, the first portion and/or the second portion of the surface-mounted vehicle may include a sensor assembly communicatively coupled to the respective controller. The sensor assembly may include a position sensor (e.g., global positioning system (GPS) sensor, inertial measurement unit (IMU) sensor, wheel rotation sensor, etc.), an object detection sensor (e.g., LIDAR sensor, RADAR sensor, ultrasonic sensor, inductive sensor, capacitive sensor, etc.), other suitable sensor(s) (e.g., light detection sensor, sound detection sensor, camera, etc.), or a combination thereof. The controller may control operation of the surface-mounted vehicle based on feedback from the sensor(s). For example, the position of the surface-mounted vehicle may be controlled based on feedback from a position sensor mounted to the first portion of the surface-mounted vehicle, and/or the surface-mounted vehicle may be controlled to avoid obstacles based on feedback from an object detection sensor mounted to the second portion of the surface-mounted vehicle.

In the illustrated embodiment, the second portion 108 of the surface-mounted vehicle 104 includes the rail coupling system 34, which is configured to couple a component 88 to the second portion 108 of the surface-mounted vehicle 104. For example, the rail coupling system 34 may include a first rail and a second rail substantially parallel to one another, as discussed above with reference to FIG. 2. The rail coupling system 34 includes multiple electrical connectors disposed along at least one of the rails, in which the electrical connectors are configured to provide electrical power to the component. In the illustrated embodiment, the electrical connector(s) establish an electrical connection 90 between the inductive receiver 124 and the component 88. While a direct electrical connection is established between the inductive receiver 124 and the component 88 (e.g., the light 24) in the illustrated embodiment, in other embodiments, the component may be electrically coupled to the inductive receiver via a controller of the surface-mounted vehicle, which is configured to control power output to the component. Furthermore, in certain embodiments, the component may be electrically coupled (e.g., directly or via a controller) to other suitable electrical power system(s) (e.g., alone or in combination with the inductive receiver), such as a battery and/or electrical conductor(s).

Furthermore, in certain embodiments, the rail coupling system includes one or more data connectors disposed on at least one rail. The data connector(s) are configured to establish a communication link between the controller of the surface-mounted vehicle and a controller of the component, thereby facilitating control of the component. In the illustrated embodiment, the controller of the surface-mounted vehicle is coupled to the body of the first portion of the surface-mounted vehicle. Accordingly, the controller of the surface-mounted vehicle may be communicatively coupled to the controller of the component by the internal communication system. In certain embodiments, the controller of the surface-mounted vehicle may be coupled to the body of the second portion of the surface-mounted vehicle. In such embodiments, the controller may be directly communicatively coupled to the controller of the component via the rail coupling system. Furthermore, in certain embodiments, the surface-mounted vehicle may include a first controller coupled to the body of the first portion of the surface-mounted vehicle, and the surface-mounted vehicle may include a second controller coupled to the body of the second portion of the surface-mounted vehicle. In such embodiments, the first and second controllers may be communicatively coupled to one another by the internal communication system. Furthermore, the controller coupled to the body of the second portion of the surface-mounted vehicle (e.g., the second controller, the single controller, etc.) may be configured to control other elements of the second portion of the surface-mounted vehicle (e.g., a propulsion system coupled to the second portion of the surface-mounted vehicle, electromagnet(s), etc.) and/or elements of the first portion of the surface-mounted vehicle (e.g., via the internal communication system).

Any of the functions of the elements disclosed above with reference to the embodiments of FIGS. 2-3 may apply to the elements of the illustrated embodiment. Furthermore, any of the variations disclosed above with reference to the embodiments of FIGS. 2-3 may apply to the illustrated embodiment. For example, any of the variations associated with the propulsion system, the mounting system, the wheels, the communication system, the controller, the electrical power system, and the battery disclosed above with reference to FIG. 3 may apply to the illustrated embodiment of the surface-mounted vehicle.

FIG. 5 is a perspective view of an embodiment of a rail coupling system 34 that may be employed within any of the surface-mounted vehicles of FIGS. 2-4 (e.g., the second portion of the surface-mounted vehicle of FIG. 4). In the illustrated embodiment, the rail coupling system 34 includes the first rail 36 and the second rail 38, which are substantially parallel to one another. While the rail coupling system 34 includes two parallel rails in the illustrated embodiment, in other embodiments, the rail coupling system may include more or fewer rails (e.g., 1, 3, 4, 5, 6, or more), in which each rail is orientated at any suitable angle.

In the illustrated embodiment, the rail coupling system 34 includes multiple electrical connectors 126 disposed along the first rail 36 and along the second rail 38. At least a portion of the electrical connectors 126 are configured to provide electrical power to the component coupled to the rail coupling system 34. For example, a first set of one or more electrical connectors may be disposed along the first rail 36, and a second set of one or more electrical connectors may be disposed along the second rail 38. In embodiments in which DC electrical power is provided to the component coupled to the rail coupling system, the first set of electrical connectors and the second set of electrical connectors may have opposite polarity, thereby facilitating electrical power transfer to the component coupled to the rail coupling system. Furthermore, in embodiments in which AC electrical power is provided to the component coupled to the rail coupling system, the first set of electrical connectors may provide one of AC electrical power or a ground connection, and the second set of electrical connectors may provide the other of the AC electrical power or the ground connection, thereby facilitating electrical power transfer to the component coupled to the rail coupling system. In addition, in certain embodiments, a first set of one or more electrical connectors may be disposed along one rail (e.g., the first rail 36 or the second rail 38), and a second set of one or more electrical connectors may be disposed along the same rail (e.g., the first rail 36 or the second rail 38). In embodiments in which DC electrical power is provided to the component coupled to the rail coupling system, the first set of electrical connectors and the second set of electrical connectors may have opposite polarity, thereby facilitating electrical power transfer to the component coupled to the rail coupling system. Furthermore, in embodiments in which AC electrical power is provided to the component coupled to the rail coupling system, the first set of electrical connectors may provide AC electrical power, and the second set of electrical connectors may provide a ground connection, thereby facilitating electrical power transfer to the component coupled to the rail coupling system.

While a rail coupling system including two sets of electrical connectors is disclosed above, in certain embodiments, the rail coupling system may include a single set of electrical connectors. In certain embodiments, each electrical connector of the rail coupling system may be configured to provide AC electrical power to the component coupled to the rail coupling system, and the component may be coupled to the ground by another suitable connection. For example, at least one rail of the rail coupling system may be formed from a conductive material (e.g., metal), and the at least one rail may be electrically coupled to the ground. Accordingly, the ground connection to the component may be established by coupling the component to the grounded rail(s) of the rail coupling system. Furthermore, each electrical connector of the rail coupling system may be configured to provide a positive or negative DC power connection to the component coupled to the rail coupling system, and the component may be coupled to the opposite DC power connection by another suitable connection. For example, at least one rail of the rail coupling system may be formed from a conductive material (e.g., metal), and the at least one rail may be electrically coupled to the opposite DC power connection (e.g., negative or positive). Accordingly, the opposite DC power connection to the component may be established by coupling the component to the corresponding rail(s).

In the illustrated embodiment, each electrical connector 126 is formed on a respective tooth 128 of the respective rail. The teeth 128 of each rail are configured to engage a respective coupler of the component to couple the component to the rail coupling system 34. In the illustrated embodiment, each electrical connector 126 is formed on an inner surface 130 of the respective tooth 128, and a corresponding electrical connector on the coupler of the component is configured to contact the electrical connector 126 of the rail coupling system 34 to establish the electrical connection 90 between the surface-mounted vehicle and the component. While the electrical connectors 126 are formed on the inner surfaces of the teeth in the illustrated embodiment, in other embodiments, at least one electrical connector may be formed on another suitable surface of a respective tooth (e.g., an outer surface of the tooth, etc.). Additionally or alternatively, multiple electrical connectors (e.g., having opposite polarities) may be formed on at least one tooth. Furthermore, in certain embodiments, one or more electrical connectors may be formed on other suitable structure(s) of at least one rail (e.g., alone or in combination with one or more electrical connectors formed on the tooth/teeth), such as on a base portion 132 of at least one rail. While multiple electrical connectors 126 are disposed along the first rail 36 and along the second rail 38 in the illustrated embodiment, in other embodiments, multiple electrical connectors may only be disposed along a single rail (e.g., the first rail 36 or the second rail 38), or a single electrical connector may be disposed along/on at least one rail (e.g., one electrical connector may be disposed on the first rail, and one electrical connector may be disposed on the second rail).

In the illustrated embodiment, electrical conductors 134 (e.g., wires, etc.) extend from each electrical connector 126 to a respective portion of an electrical power system. For example, in certain embodiments, the electrical connectors 126 of the first rail 36 may be electrically coupled to a positive terminal of an electrical power system, and the electrical connectors 126 of the second rail 38 may be electrically coupled to a negative terminal of the electrical power system. Furthermore, in certain embodiments, the electrical connectors 126 of the first rail 36 may be electrical coupled to an energized terminal of an electrical power system, and the electrical connectors 126 of the second rail 38 may be electrically coupled to a ground terminal of the electrical power system. In other embodiments, each electrical connector may be electrically coupled to another suitable portion of the electrical power system via the electrical conductors. As previously discussed, the electrical power system may include an inductive receiver, electrical conductors, or a combination thereof. Furthermore, in certain embodiments, at least one electrical connector may be electrically coupled to the electrical power system(s) via the controller.

Furthermore, in certain embodiments, the rail coupling system 34 includes one or more data connectors 136 disposed on/along at least one rail. The data connector(s) are configured to establish the communication link 98 between the surface-mounted vehicle (e.g., the controller of the surface-mounted vehicle) and the component (e.g., the controller of the component), thereby facilitating control of the component. In the illustrated embodiment, each data connector 136 is formed on a respective tooth 128 of the respective rail. As previously discussed, the teeth 128 of each rail are configured to engage a respective coupler of the component to couple the component to the rail coupling system 34. In the illustrated embodiment, each data connector 136 is formed on the inner surface 130 of the respective tooth 128, and a corresponding data connector on the coupler of the component is configured to contact the data connector 136 of the rail coupling system 34 to establish the communication link 98 between the surface-mounted vehicle and the component. While the data connectors 136 are formed on the inner surfaces of the teeth in the illustrated embodiment, in other embodiments, at least one data connector may be formed on another suitable surface of a respective tooth (e.g., an outer surface of the tooth, etc.). Additionally or alternatively, multiple data connectors may be formed on at least one tooth. In addition, in certain embodiments, one or more data connectors and one or more electrical connectors may be formed on at least one tooth. The electrical connector(s) and/or the data connector(s) may be positioned at any suitable location(s) along each rail (e.g., in an alternating pattern, in groups, etc.). Furthermore, in certain embodiments, one or more data connectors may be formed on other suitable structure(s) of at least one rail (e.g., alone or in combination with one or more data connectors formed on the tooth/teeth), such as on the base portion 132 of at least one rail. While multiple data connectors 136 are disposed along the first rail 36 and along the second rail 38 in the illustrated embodiment, in other embodiments, data connector(s) may only be disposed along/on a single rail (e.g., the first rail 36 or the second rail 38), and/or a single data connector may be disposed on at least one rail. Furthermore, in certain embodiments, data connectors may be omitted from the rail coupling system (e.g., in embodiments in which a wireless communication link is established between the component coupled to the rail coupling system and the surface-mounted vehicle and/or the remote control system).

As previously discussed, each rail includes a base portion 132 and multiple teeth 128 extending from the base portion 132. In the illustrated embodiment, each tooth 128 includes a lateral protrusion 138 configured to engage a respective lateral recess of the mounting portion (e.g., coupler) of the component. For example, in certain embodiments, the component may include one or more couplers (e.g., one or more couplers for each rail), and each coupler may include opposing lateral recesses configured to receive the respective lateral protrusions 138 of the teeth 128. In such embodiments, each coupler of the component may be engaged with the respective rail by aligning the lateral recesses of the coupler with the lateral protrusions of the respective rail and then translating the coupler of the component toward the rail (e.g., by moving the component toward the rail coupling system). Once the lateral protrusions of each rail are engaged with the lateral recesses of a respective coupler, the component may be translated along the rail(s) to a desired position. One or more fasteners may then be used to secure each coupler of the component in the desired position along the respective rail. The rail coupling system may support the load (e.g., weight) of the component while the surface-mounted vehicle is coupled to any suitable surface (e.g., wall, ceiling, stage, etc.). For example, the rail coupling system may enable the surface-mounted vehicle to support the component as the surface-mounted vehicle transitions between suitable surfaces (e.g., wall(s), ceiling, stage, etc.) and while the surface-mounted vehicle is positioned on the suitable surface.

While the lateral protrusions 138 are formed on the teeth 128 of each rail in the illustrated embodiment, in other embodiments, at least one lateral protrusion of at least one rail may be formed on another suitable structure of the rail (e.g., the base portion). Furthermore, while the rail coupling system includes lateral protrusions on each rail configured to engage lateral recesses within each corresponding coupler of the component in the illustrated embodiment, in other embodiments, lateral recess(es) may be formed within at least one rail, and lateral protrusion(s) may extend from at least one respective coupler of the component. Additionally or alternatively, at least one rail of the rail coupling system may include any other suitable structure configured to couple the component to the surface-mounted vehicle (e.g., alone or in combination with the protrusion(s)), such as a magnetic coupling assembly, a slot configured to receive a protrusion of the respective coupler(s), inwardly facing protrusion(s) configured to engage outwardly facing recess(es) of the respective coupler(s), inwardly facing recess(es) configured to engage outwardly facing protrusion(s) of the respective coupler(s), other suitable structure(s), or a combination thereof.

In the illustrated embodiment, each rail of the rail coupling system 34 is coupled to a respective mount 140 of the surface-mounted vehicle. In certain embodiments, each mount 140 may be coupled to the body 30 of the surface-mounted vehicle. As illustrated, each mount 140 includes a tongue 142 configured to engage a groove 144. Each groove 144 is formed by a respective rail and a respective engagement member 146, which is coupled to the respective rail by fasteners 148. To couple each rail to a respective mount 140, the engagement member 146 may be loosely coupled to the rail by the fasteners 148, the groove 144 formed by the engagement member 146 and the rail may be aligned with the tongue 142 of the respective mount 140. The rail/engagement member may then be moved toward the mount, such that the tongue 142 engages the groove 144. The fasteners 148 may be tightened to secure the rail in a target location along the mount 140. While each rail is coupled to the respective mount by the tongue and groove connection in the illustrated embodiment, in other embodiments, at least one rail may be secured to the respective mount and/or to another suitable structure of the surface-mounted vehicle by any other suitable type(s) of connection(s) (e.g., alone or in combination with the tongue and groove connection), such as a welded connection, an adhesive connections, a connection established by fasteners, other suitable connection(s), or a combination thereof.

In certain embodiments, multiple surface-mounted vehicles may cooperatively support a component within the performance environment. For example, a weight of the component and, in certain embodiments, an expected maximum load supported by the component may exceed the force provided by the mounting system that couples the surface-mounted vehicle to the surface assembly (e.g., while the surface-mounted vehicle is positioned at the ceiling). Accordingly, the component may be coupled to multiple surface-mounted vehicles (e.g., 2, 3, 4, 5, 6, or more), such that the combined force provided by the mounting systems exceeds the weight of the component/the expected maximum load supported by the component. For example, the component may include a large light, a large speaker, a winch configured to lift other objects, or another suitable component. The component may have couplers that are spaced to engage one or more rails of each surface-mounted vehicle, thereby coupling the component to multiple surface-mounted vehicles. The electrical power connection and/or the communication link may be established by one or more of the surface-mounted vehicles. Furthermore, the surface-mounted vehicles coupled to the component may be controlled together to control movement of the component within the performance environment. While coupling a heavy component to multiple surface-mounted vehicles is disclosed above, in certain embodiments, multiple surface-mounted vehicles may be coupled to a component (e.g., a lightweight component) to provide additional electrical power to the component. For example, a component (e.g., light, speaker, etc.) may utilize more electrical power than a single surface-mounted vehicle is capable of providing. Accordingly, multiple surface-mounted vehicles may be coupled to the component to provide sufficient electrical power to the component.

In certain embodiments, the surface assembly may include a maintenance section positioned outside of the performance environment. In such embodiments, the surface-mounted vehicle may be configured to move to the maintenance section (e.g., in response to receiving a signal from a remote control system, in response to instructions stored within the memory of the controller, etc.), and an operator may access the surface-mounted vehicle while the surface-mounted vehicle is in the maintenance section. For example, the operator may remove one component from the surface-mounted vehicle and attach a difference component. In addition, the operator may perform maintenance operations on the surface-mounted vehicle while the surface-mounted vehicle is within the maintenance section. Additionally or alternatively, the surface-mounted vehicle may receive data and/or recharge the battery while the surface-mounted vehicle is positioned in the maintenance section of the surface assembly. For example, in certain embodiments, the maintenance section may include electrical conductor(s) configured to facilitate transfer of electrical power to the surface-mounted vehicle and/or to establish a communication link between a remote control system and the surface-mounted vehicle. Furthermore, in certain embodiments, the maintenance and/or reconfiguration operations may be performed automatically by a mechanical system (e.g., robot, etc.). For example, the mechanical system may remove the surface-mounted vehicle from the surface assembly and perform maintenance operations on the surface-mounted vehicle and/or remove and replace the component coupled to the surface-mounted vehicle. In certain embodiments, the mechanical system may perform the maintenance and/or reconfiguration operation(s) while the surface-mounted vehicle is coupled to the surface assembly. Furthermore, in certain embodiments, the maintenance section may be movable. For example, the maintenance section may receive the surface-mounted vehicle and then move the surface-mounted vehicle to a suitable area for maintenance and/or reconfiguration operation(s).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A surface-mounted vehicle, comprising:
a body;
a mounting system configured to couple the surface-mounted vehicle to a surface;
a propulsion system configured to move the surface-mounted vehicle along the surface;
a rail coupling system, comprising:
at least one rail coupled to the body, wherein the at least one rail is configured to couple a component to the surface-mounted vehicle; and
a plurality of electrical connectors disposed along the at least one rail, wherein the plurality of electrical connectors is configured to provide electrical power to the component; and
an inductive power system configured to receive power from an inductive power source and to output the electrical power to the component.

2. The surface-mounted vehicle of claim 1, wherein the rail coupling system comprises a first rail and a second rail substantially parallel to one another.

3. The surface-mounted vehicle of claim 2, wherein the plurality of electrical connectors comprises a first set of one or more electrical connectors disposed along the first rail and a second set of one or more electrical connectors disposed along the second rail, and the first set of one or more electrical connectors and the second set of one or more electrical connectors are configured to have opposite polarity.

4. The surface-mounted vehicle of claim 2, wherein the first rail and the second rail are coplanar.

5. The surface-mounted vehicle of claim 1, wherein the plurality of electrical connectors comprises multiple electrical connectors disposed along each rail of the at least one rail.

6. The surface-mounted vehicle of claim 1, comprising at least one data connector disposed on the at least one rail.

7. The surface-mounted vehicle of claim 1, comprising a battery electrically coupled to the plurality of electrical connectors and configured to provide the electrical power to the component.

8. The surface-mounted vehicle of claim 1, comprising a controller comprising a memory and a processor, wherein the controller is communicatively coupled to the propulsion system and configured to control movement of the surface-mounted vehicle.

9. The surface-mounted vehicle of claim 8, comprising a communication system communicatively coupled to the controller, wherein the communication system is configured to receive instructions indicative of controlling the surface-mounted vehicle.

10. A theatrical production system, comprising:
a surface assembly comprising an inductive transmitter; and
a surface-mounted vehicle, comprising:
a body;
a mounting system configured to couple the surface-mounted vehicle to the surface assembly;
a propulsion system configured to move the surface-mounted vehicle along the surface assembly;
a rail coupling system, comprising:
at least one rail coupled to the body, wherein the at least one rail is configured to couple a component to the surface-mounted vehicle; and
a plurality of electrical connectors disposed along the at least one rail, wherein the plurality of electrical connectors is configured to provide electrical power to the component; and
an inductive receiver configured to receive power from the inductive transmitter and to output the electrical power to the component.

11. The theatrical production system of claim 10, wherein the surface assembly comprises a first electrical conductor, the surface-mounted vehicle comprises a second electrical conductor configured to contact the first electrical conductor, and the first and second electrical conductors are configured to facilitate transfer of the electrical power to at least a portion of the plurality of electrical connectors.

12. The theatrical production system of claim 10, wherein the surface assembly, the mounting system of the surface-mounted vehicle, or a combination thereof, comprises at least one magnet configured to couple the surface-mounted vehicle to the surface assembly.

13. The theatrical production system of claim 10, wherein the surface-mounted vehicle comprises a first portion positioned on a first side of the surface assembly and a second portion positioned on a second side of the surface assembly, opposite the first side, the first portion comprises the propulsion system, the second portion comprises the body and the rail coupling system, and the mounting system is distributed between the first and second portions to couple the surface-mounted vehicle to the surface assembly.

14. The theatrical production system of claim 10, wherein the rail coupling system comprises a first rail and a second rail substantially parallel to one another, and wherein the first rail and the second rail are coplanar.

15. The theatrical production system of claim 14, wherein the plurality of electrical connectors comprises a first set of one or more electrical connectors disposed along the first rail and a second set of one or more electrical connectors disposed along the second rail, and the first set of one or more electrical connectors and the second set of one or more electrical connectors are configured to have opposite polarity.

16. A surface-mounted vehicle, comprising:
a body;
a magnetic mounting system comprising at least one magnet configured to couple the surface-mounted vehicle to a surface;
a plurality of wheels rotatably coupled to the body and configured to engage the surface;
a propulsion system configured to drive at least one wheel of the plurality of wheels to rotate to move the surface-mounted vehicle along the surface;
a rail coupling system, comprising:
at least one rail coupled to the body, wherein the at least one rail is configured to couple a component to the surface-mounted vehicle; and
a plurality of electrical connectors disposed along the at least one rail, wherein the plurality of electrical connectors is configured to provide electrical power to the component; and
an inductive power system configured to receive power from an inductive power source and to output the electrical power to the component.

17. The surface-mounted vehicle of claim 16, comprising a controller comprising a memory and a processor, wherein the controller is communicatively coupled to the propulsion system and configured to control movement of the surface-mounted vehicle.

18. The surface-mounted vehicle of claim 16, wherein the rail coupling system comprises a first rail and a second rail substantially parallel to one another, the plurality of electrical connectors comprises a first set of one or more electrical connectors disposed along the first rail and a second set of one or more electrical connectors disposed along the second rail, and the first set of one or more electrical connectors and the second set of one or more electrical connectors are configured to have opposite polarity.

19. The surface-mounted vehicle of claim 18, wherein the first rail and the second rail are coplanar.

20. The surface-mounted vehicle of claim 16, comprising at least one data connector disposed on the at least one rail.

* * * * *